(12) United States Patent
Skyba

(10) Patent No.: US 7,076,844 B2
(45) Date of Patent: Jul. 18, 2006

(54) OPEN SIDED CAM LOCK FOR ROPES

(76) Inventor: Helmut K. Skyba, W6740 Norwegian La., Wild Rose, WI (US) 54984

( * ) Notice: Subject to any disclaimer, the term of this patent is extended or adjusted under 35 U.S.C. 154(b) by 12 days.

(21) Appl. No.: 10/837,800

(22) Filed: May 3, 2004

(65) Prior Publication Data

US 2005/0241117 A1    Nov. 3, 2005

(51) Int. Cl.
*F16G 16/00*    (2006.01)
(52) U.S. Cl. .................................... 24/134 R
(58) Field of Classification Search .............. 24/134 R, 24/134 KB, 132 AA, 132 R; 114/199, 218
See application file for complete search history.

(56) References Cited

U.S. PATENT DOCUMENTS

| | | | | |
|---|---|---|---|---|
| 2,080,700 A | * | 5/1937 | Dale | 24/134 R |
| 2,238,386 A | * | 4/1941 | Frank | 24/134 R |
| 3,793,682 A | * | 2/1974 | Nelson | 24/134 P |
| 4,424,609 A | * | 1/1984 | Boden | 24/134 R |
| 4,639,978 A | * | 2/1987 | Boden | 24/134 R |
| 4,716,630 A | | 1/1988 | Skyba | |
| 4,878,270 A | * | 11/1989 | Westerkamp | 24/132 R |
| 5,133,111 A | | 7/1992 | Brown | |
| 6,178,603 B1 | | 1/2001 | Lillig | |

* cited by examiner

*Primary Examiner*—Robert J. Sandy
(74) *Attorney, Agent, or Firm*—Alan O. Maki; Foster, Swift, Collins & Smith, P.C.

(57) ABSTRACT

A cam lock device for flexible ropes, cords or similar elongated materials has a pivotable cam element with a convexly curved, preferably knurled periphery and an eccentrically located pivot point supporting it on a base. A stationary cam surface integral with the base faces the cam element and includes at least one curved surface projecting towards the cam element for wedging the elongated material between the cam element and the stationary cam surface. A retaining edge above the stationary cam surface is spaced from the base a sufficient distance to allow pivoting of the cam element in a channel between the base and the edge. A pivot pin through the pivot point is supported on opposite ends thus stably supporting the cam element.

12 Claims, 3 Drawing Sheets

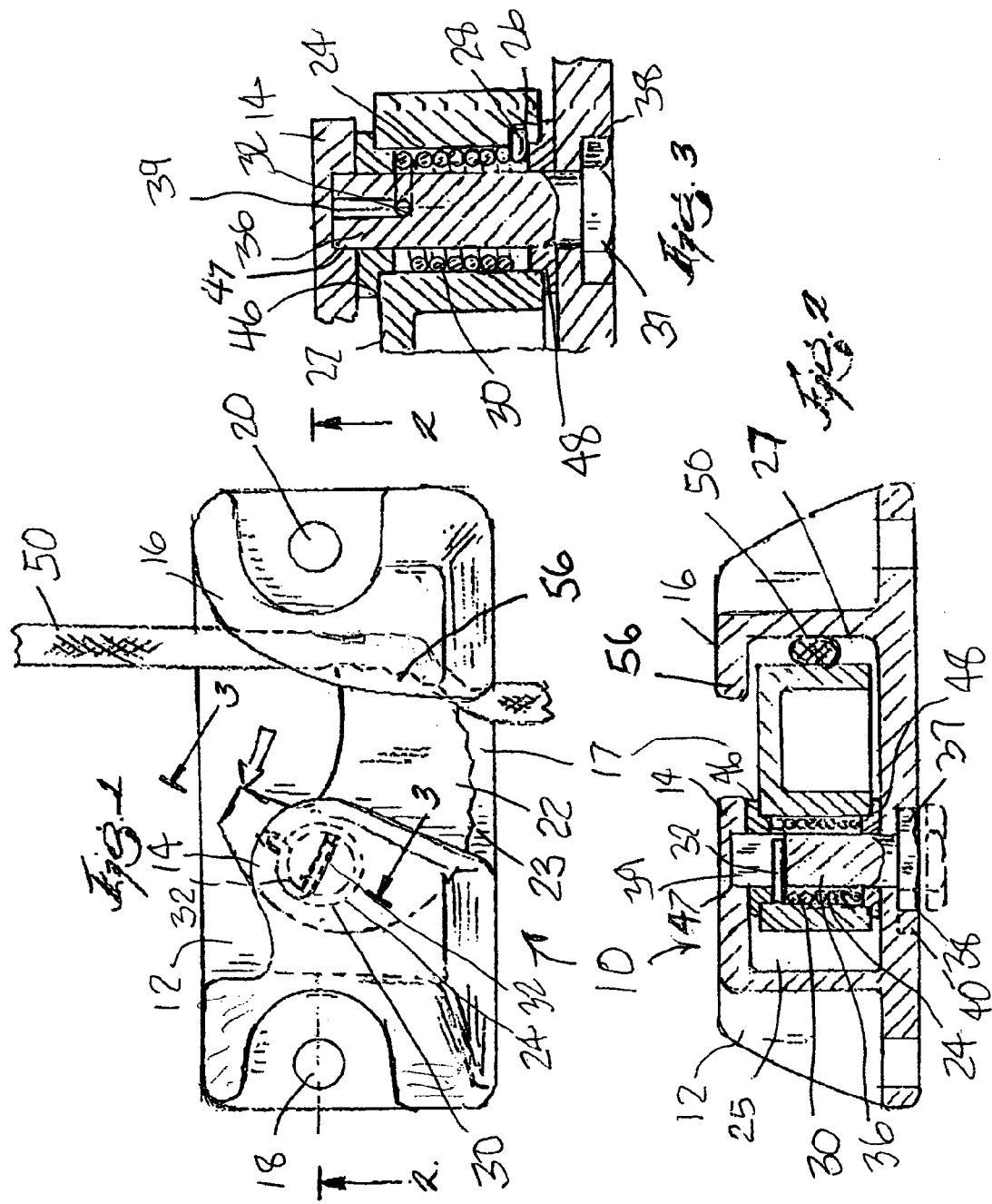

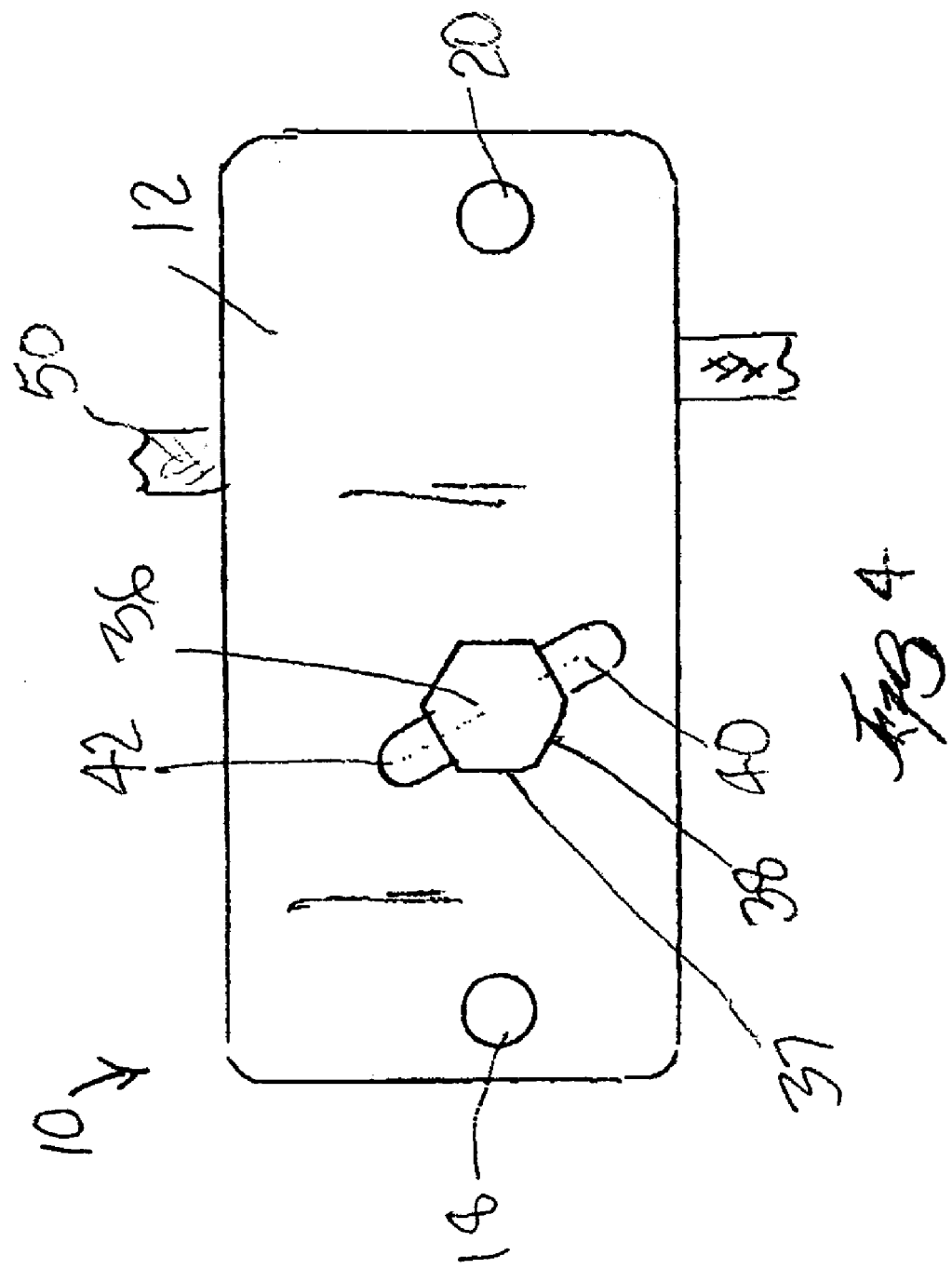

OPEN SIDED CAM LOCK FOR ROPES

FIELD OF THE INVENTION

The present invention relates to a cam lock device used to secure ropes, cords or similar elongated materials. More particularly, the invention relates to such a device that utilizes a spring biased cam element to secure a rope or similar elongated article against movement in one direction while allowing movement in the opposite direction.

BACKGROUND ART

Various ratchet and cam lock devices have heretofore been devised for use in securing loads to motor vehicles, securing watercraft to docks, tree stands to trees, and numerous other applications wherein a rope or cord is used to secure two articles together. An example of such a device is that which is illustrated in my earlier U.S. Pat. No. 4,716,630, issued Jan. 5, 1988.

The present invention relates to an improvement in the aforementioned art.

SUMMARY OF THE INVENTION

The invention provides a mechanism for locking a rope, cord or similar elongated flexible material utilizing a single eccentric pivoting cam member. An important feature of the invention is the provision of such a device wherein one side of the cam member is exposed. This feature enables the insertion of any point along the length of the rope or cord against the cam member so that when the rope or cord is engaged, it is locked in place against movement in one direction but free to slide in the opposite direction along its length, thus providing an action similar to that provided by a ratchet wheel. The invention, accordingly, eliminates the need for threading one end of the rope or cord into the mechanism as is commonly required by most prior devices.

In accordance with an important aspect of the invention, the cam member is mounted in a housing open on one side and formed of a base integral with first and second opposite end portions separated by the open central portion. In accordance with a related aspect, the first end portion is undercut forming a cavity or channel which is provided with an opening for receiving a pin to pivotally support the cam member. The cam member has an aperture for receiving the pin. A pivot pin through the pivot point is supported on opposite ends thus stably supporting the cam element.

The opposite end portion of the housing member also contains an undercut portion which forms a channel for receiving a free end of the cam member as it pivots whereby a rope can be entrapped between the housing member and the cam member.

In accordance with a further aspect of the invention, the cam member is biased to a closed position against the wall of a channel in the second end of the housing member, preferably by means of a coil spring. The biasing force of the spring can be manually overcome to pivot the cam member in order to allow insertion of any portion along the length of a rope or cord into the device. A related feature of the invention enables the spring tension, and thus, the force needed to pivot the cam member to be adjusted utilizing simple tools.

In accordance with a further aspect of the invention, a curved surface is provided in the channel for receiving a convex cam surface so as to provide non-jamming entrapment of a rope or cord. A further related aspect of the invention is that the cam member has a knurled convex surface with a texture effective to frictionally engage the rope or cord, but without damaging or fraying the same.

Yet another aspect of the invention is the provision of a ratchet-like cam member which, while non-jamming, allows no possibility of removal of the rope or cord toward the load side, or in the load direction.

Briefly, the invention provides a cam lock device for flexible ropes, cords or similar elongated materials which has a pivotable cam element with a convexly curved, preferably knurled periphery and an eccentrically located pivot point supporting it on a base. A stationary cam surface integral with the base faces the cam element and includes at least one and preferably two curved surfaces projecting towards the cam element for wedging the elongated material between the cam element and the stationary cam surface. A retaining edge of the channel located above the stationary cam surface is spaced from the base a sufficient distance to allow pivoting of the cam element into the channel between the base and the edge thereby entrapping the elongated material. Other aspects and advantages of the invention will be apparent from the appended claims and the accompanying drawings.

BRIEF DESCRIPTION OF THE FIGURES

The foregoing features, as well as other features, will become apparent with reference to the description and figures below, in which like numerals represent like elements, and in which:

FIG. 1 is a top plan view of a device in accordance with the invention showing a fragmentary portion of a rope entrapped therein and showing various hidden parts by means of phantom lines;

FIG. 2 is a cross sectional view taken along line 2—2 of FIG. 1;

FIG. 3 is a cross sectional view taken along line 3—3 of FIG. 1;

FIG. 4 is a bottom view of the device shown in FIG. 1;

DETAILED DESCRIPTION

Figure 5:
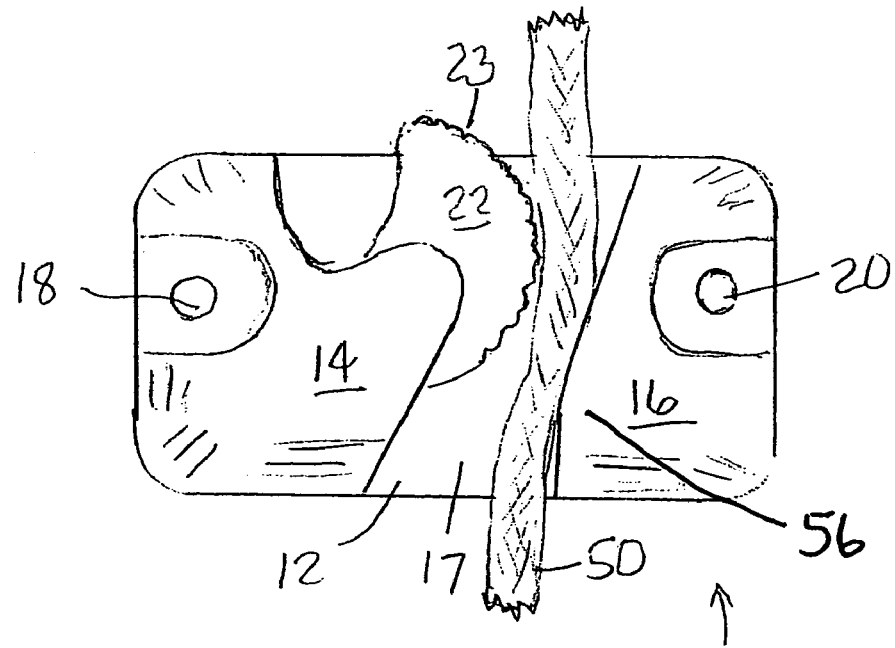
FIG. 5 is a top view of the device of FIG. 1 showing the pivotable cam element in the open position and insertion of a fragmentary rope portion therein.

Referring more particularly to the drawings, there is shown a locking device 10 of this invention. Device 10 includes a body portion 12 which can be formed, for example, out of cast or injection molded metal such as aluminum or other tough, durable material such as a ceramic or a polymeric plastic material. At each end of body portion 12 is a thickened or upwardly extending end portion 14 and 16. Each end portion 14 and 16 is undercut so as to form an open-sided housing for containing the working parts of locking device 10. Between end portions 14 and 16 is an open area 17. Open area 17 allows access to a pivotable cam member 22, and allows insertion of any part along the length of a rope or cord 50 into locking device 10. Apertures 18 and 20 are provided at opposite ends of the body portion 12 to provide a means for mounting the ratchet device 10 at a location where it is to be used such as, for example, the gunwale of a watercraft or cargo compartment of a truck.

Cam member 22 is provided on one side with a knurled surface 23 which is useful in facilitating pivoting of member 22 to the open position shown in FIG. 5 by pulling rope 50 against the knurled surface 23. Cam member 22 is pivotally mounted in the channel 25 under the overhang of the undercut portion of end segment 14 as illustrated. For that purpose, an aperture 24 extends though one end of the cam member 22 receiving a pin 36 for eccentrically mounting member 22 for pivoting. A recess or indentation 26 open to aperture 24 is provided for receiving one end 28 of a coil spring 30, as best seen in FIG. 3. End 28 extends outwardly from the outer surface of coil spring 30 into the opening 26 to prevent rotation of the spring 30. The opposite end 32 of the spring 30 is bent so as to extend diagonally across the diameter of the spring 30.

Also as shown, a pin 36, which is provided at one end with a hexagon or other polygon shaped head 37 is provided with a slotted opposite end 39 which is configured to straddle the end 32 of spring 30. Referring again to FIGS. 2 and 3, it will be noted that collared washers 46 and 48 are provided in order to aid in positioning pin 36 within aperture 24 in a manner such that a space is provided for coil spring between the perimeter of aperture 24 and the surface of pin 36.

As best seen in FIG. 4, the hexagon shaped head 37 is received within an appropriately sized hexagon shaped recess or indention 38 in the bottom of body member 12. Also shaped into the bottom of body member 12 on opposite sides of cavity 38 are slots 40 and 42. At least one such slot 40 or 42 is provided to permit the head 37 of pin 36 to be grasped by a tool such as long-nosed pliers. This enables partial retraction and rotation of pin 36 for the setting of the tension of coil spring 30 to desired tightness. The tension is set by rotating the pin 36, as desired, against the rotational resistance of spring end 32. The cam member 22 is supported from above and below by virtue of the fact that the upper slotted end of pin 36 is received in the recess 47 formed under the overhanging portion of end 14. The pressure exerted by cam 22 against the cam surface 52 on end 16 is thus set by manually rotating pin 36 and inserting it with the tool into the cavity 38. The location of head 37 of pin 36 in recess 38 results in the head 37 being inaccessible once the tension of spring 30 is set and device 10 is fastened in place using apertures 18 and 20.

Figure 6:
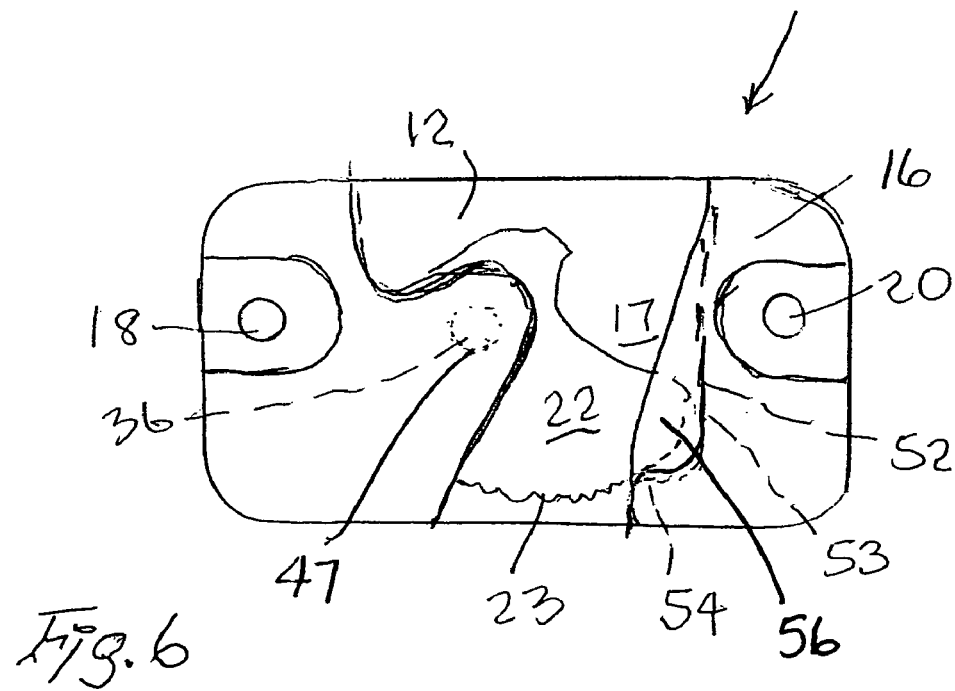
FIG. 6 is a top view of the device of FIG. 1 shown in the closed position.

As best seen in FIG. 6, the cam surface 52 is configured so that two pressure points 53 and 54 are provided between the convexly curved surface 23 of the pivotable cam element 22. This configuration causes rope 50 to be firmly clamped between the pivotable member 22 at contact point 53 and protrusion 54, leaving an intermediate area of the rope 50 therebetween at which significantly less pressure is exerted. This configuration ensures a positive engagement of the rope similar to that described in my earlier U.S. Pat. No. 4,716, 630. The presence of these two contact or pressure points 53 and 54 causes formation of a slight bulge in the rope 50 thus providing enhanced holding power of the cam lock device 10 to the rope 50 with less overall compression of the rope 50 than would otherwise be required. More importantly, this configuration provides a non-jamming entrapment of rope 50 thereby avoiding situations wherein jamming together of the rope 50 and the cam elements would prevent release of the rope 50 when desired. The rope 50 is also caused to bend nearly 90 degrees between the contact points 53, 54 and again at the point of exit from device 10. These multiple bends in the rope 50 also assist in providing resistance to slippage of rope 50 in the load direction.

In use, once locking device 10 is mounted in its use location utilizing fasteners usually screws, rivets or bolts, extending through apertures 18 and 20, the body portion 12 of the locking device 10 is firmly held in a selected stationary position. Then, as seen in FIG. 5, sliding of the rope 50 against the knurled surface 23 causes pivoting of the pivotable cam element 22 upwardly as viewed in FIG. 5 so that a space sufficient for insertion of the rope 50 is opened between pivotable element 22 and cam surface 52. Once the cam element 22 is released, the force of spring 30 forces the cam element 22 to push rope 50 against cam surface 52. In that position the presence of the overhanging part 56 of end portion 16 entraps rope 50 so that pulling upwardly (or in any other direction) on the load portion of rope 50 does not permit removal of rope 50 from device 10, thus eliminating a problem experienced with prior art devices.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

What is claimed is:

1. A cam lock device for flexible elongated materials, comprising a pivotable cam element with a convexly curved periphery and having a first aperture therethrough eccentrically located relative to the curved periphery;
   a base supporting an upwardly extending member that has an edge overhanging a channel between said base and said edge;
   said base having a second aperture therethrough opening into said channel;
   a pin passing through said first and second apertures pivotally supporting said cam element in said channel, said pin being also supported at an end thereof opposite said base;
   a stationary cam surface integral with said base facing said pivotable cam element and including at least one curved surface projecting towards said pivotable cam element;
   a retaining edge above said stationary cam surface spaced from said base a sufficient distance to allow pivoting of said cam element between said base and said edge, said cam being pivotable from an open position wherein said cam periphery is spaced from said retaining edge a distance sufficient to allow insertion of a portion of said elongated material, intermediate ends of said elongated material, between said curved periphery and said stationary cam surface and a closed position wherein said elongated material is wedged between said cam element and said stationary cam surface; and
   said overhanging edge being separated from said retaining edge by an open space.

2. A cam lock device according to claim 1 wherein said base, said stationary cam element and said upwardly extending support member are all formed of a single piece of shaped material.

3. A cam lock device according to claim 2 wherein said shaped material comprises injection molded aluminum.

4. A cam lock device according to claim 1 further comprising a spring which biases said pivotable cam element toward said stationary cam surface.

5. A cam lock device according to claim 4 wherein said spring comprises a coil spring positioned around said pin.

6. A cam lock device according to claim 5 wherein said pin is provided with a slotted end for engaging a first end of said coil spring.

7. A cam lock device according to claim 6 wherein an end of said coil spring opposite said first end is retained in a recess in said pivotable cam element, thereby preventing rotation of said spring.

8. A cam lock device according to claim 1 wherein said stationary cam surface is configured at two points and a segment having less pressure is located between said two points.

9. A cam lock device according to claim 1 wherein said convexly curved periphery comprises a knurled surface.

10. A cam lock device for a rope, comprising:
- a pivotable cam element with a convexly curved periphery and having a first aperture therethrough eccentrically located relative to the curved periphery;
- a base having a second aperture therethrough;
- a pin passing through said first and second apertures pivotally supporting said cam element on said base in a channel between said base and an upwardly extending support member that has an edge overhanging said channel and wherein a cylindrical recess is provided in said edge for receiving an end of said pin;
- a coil spring positioned around said pin which biases said pivotable cam element toward said stationary cam surface, said pin having a non-circular head that is received in a plurality of rotational orientations in a mating recess in said base, the force applied to said cam element being variable by rotation of said pin and insertion of said head into said recess in a selected orientation;
- a stationary cam surface integral with said base facing said pivotable cam element and including at least one curved surface projecting towards said pivotable cam element for wedging said rope between said cam element and said stationary cam surface; and
- a retaining edge above said stationary cam surface spaced from said base a sufficient distance to allow pivoting of said cam element between said base and said edge.

11. A device according to claim 10 wherein said recess and the head of said pin each have a hexagonal cross section.

12. A device according to claim 11 wherein the head of said pin is seated entirely in said recess whereby said head is concealed during use of said device when said device is mounted to a flat surface.

* * * * *